(12) United States Patent
Merrill

(10) Patent No.: US 9,875,267 B1
(45) Date of Patent: Jan. 23, 2018

(54) STATE-BASED MESSAGE GENERATION

(71) Applicant: EMC Corporation, Hopkinton, MA (US)

(72) Inventor: Marshall L. Merrill, Durham, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 66 days.

(21) Appl. No.: 13/631,637

(22) Filed: Sep. 28, 2012

(51) Int. Cl.
*G06F 7/00* (2006.01)
*G06F 17/30* (2006.01)

(52) U.S. Cl.
CPC .. *G06F 17/30345* (2013.01); *G06F 17/30353* (2013.01)

(58) Field of Classification Search
CPC .................................................. G06F 17/30353
USPC ......................................................... 707/781
See application file for complete search history.

(56) References Cited

U.S. PATENT DOCUMENTS

| 2007/0094490 A1* | 4/2007 | Lohr ...................... H04L 67/14 713/153 |
| 2007/0153782 A1* | 7/2007 | Fletcher et al. .............. 370/389 |
| 2011/0185010 A1* | 7/2011 | Shatsky et al. ............... 709/203 |
| 2013/0046893 A1* | 2/2013 | Hauser et al. ................ 709/226 |

* cited by examiner

*Primary Examiner* — Ajith Jacob
(74) *Attorney, Agent, or Firm* — Hamilton, Brook, Smith & Reynolds, P.C.

(57) ABSTRACT

In one embodiment, a method includes, upon receiving a first message from a device, updating a table stored in a memory with a state of the device contained in the first message. The method further includes associating the state of the device stored in the table with a timestamp. The method additionally includes, in response to a request for the state of the device, generating a second message that includes from the table the state having an earliest associated timestamp, the second message being previously unseen by the application module.

16 Claims, 7 Drawing Sheets

| HOST ID | STATUS | TIMESTAMP |
|---------|--------|-----------|
| AAA | UP | 9/20/2012, 8:15:05 AM |
| BBB | DOWN | 9/20/2012, 8:20:15 AM |
| CCC | DOWN | 9/19/2012, 9:15:23 AM |
| ... | ... | |
| NNN | UP | 9/20/2012, 7:32:15 AM |

FIG. 3

STATE-BASED MESSAGE GENERATION

BACKGROUND

Many message generation systems send messages to many different destinations. For example, when a communication link fails, machines that use the link should be notified. In such a situation, an overwhelming number of messages can be generated, which can cause buffer overflows to systems that receive these messages.

BRIEF DESCRIPTION OF THE DRAWINGS

In the accompanying drawings like reference characters refer to the same parts throughout the different views. The drawings are not necessarily to scale, emphasis instead being placed upon illustrating embodiments.

FIG. 3 is a table illustrating an example embodiment of the global status table.

DETAILED DESCRIPTION

A description of example embodiments follows.

To avoid the problems noted above, messages can be generated indicating that the state (e.g., state of a link) changed, and include a timestamp. A global location can analyze the state messages and store the state of each link and/or machine. Processes that require the status of the link or machine can then request the status from the global location. In this way, every state message is not sent to every application, saving valuable application buffer space.

In one embodiment, a method includes, upon receiving a first message from a device, updating a table stored in a memory with a state of the device contained in the first message. In one embodiment, a device can be a mainframe or a host. The method further includes associating the state of the device stored in the table with a timestamp. The method additionally includes, in response to a request for the state of the device, generating a second message that includes from the table the state having an earliest associated timestamp, where the second message being previously unseen by an application module.

The method may further include classifying the state of the device into a category, locating, in the table, a second state associated with the category, and overwriting, in the table, the located state with the state of the device contained in the first message.

The method may further include notifying the application module that the table stores an updated state for the device. Notifying the application module may further include, upon receiving the state of the device, setting a semaphore, and requesting, for the application module and in response to the set semaphore, the state of the device. The method may also include waiting to receive the notification before requesting the state of the device.

The state may represent the availability of a host over a network. The table may store a plurality of states for the device. The table may store states for a plurality of devices.

The method may also include receiving, from an application module, a timestamp of a last seen message by the application module. Generating the second message may further include determining updates to the state since the timestamp of the last seen message.

In one embodiment, a system may include an update module configured to, upon receiving a first message from a device, update a table stored in a memory with a state of the device contained in the first message. The system may also include an association module configured to associate the state of the device stored in the table with a timestamp, and a table update module configured to, in response to a request for the state of the device, generate a second message that includes from the table the state having an earliest associated timestamp, the second message being previously unseen by an application module.

Figure 1:
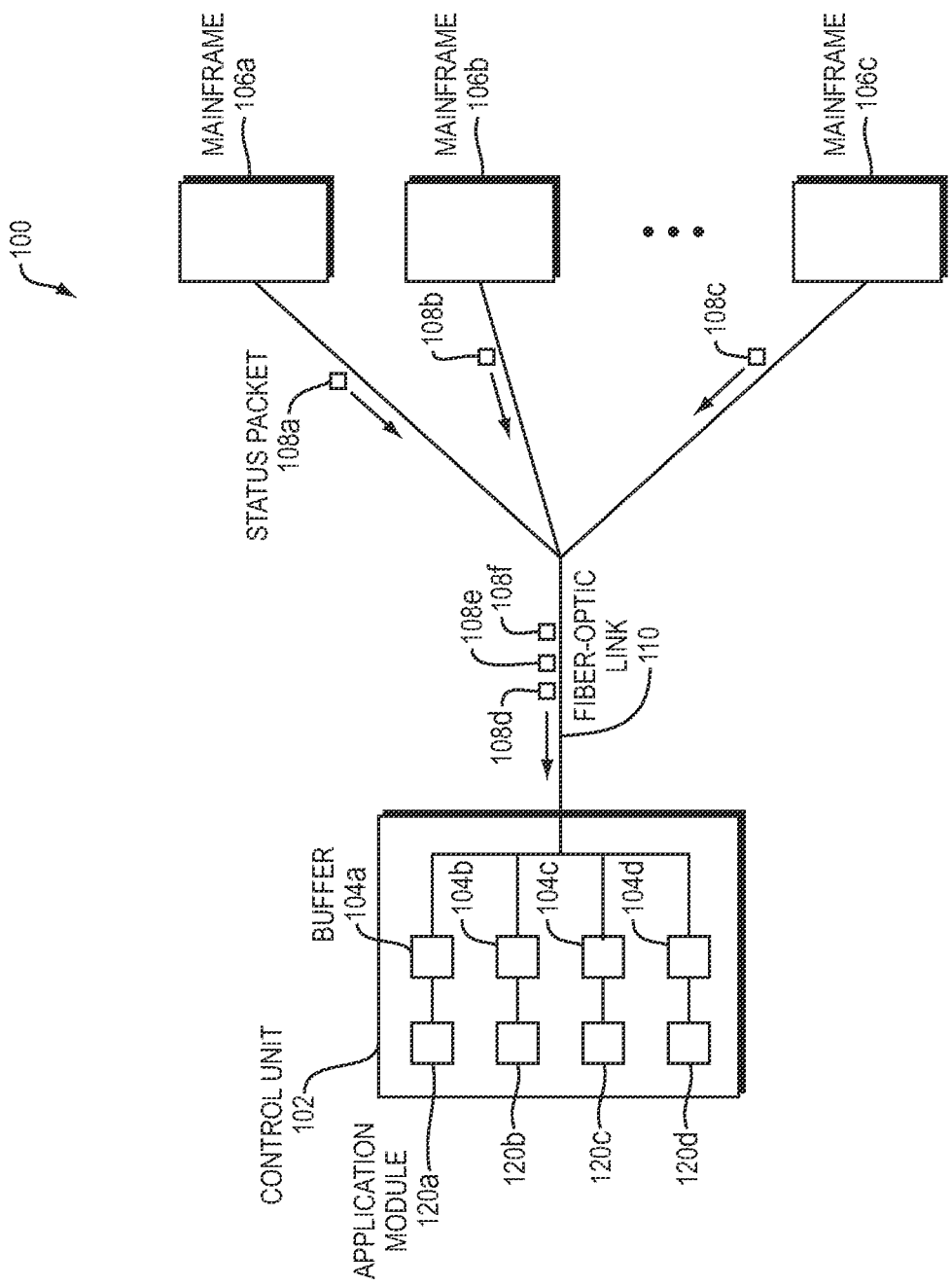
FIG. 1 is a block diagram illustrating an example embodiment of a control unit receiving status packets from a plurality of mainframes.

FIG. 1 is a block diagram 100 illustrating an example embodiment of a control unit 102 receiving status packets 108 from a plurality of mainframes 106. The mainframes 106 can be also referred to as devices or hosts. In this embodiment, the control unit 102 includes a plurality of application modules 120*a-d* individually coupled to one of a plurality of buffers 104*a-d*, respectively. Each application module 120*a-d* reads status updates of the mainframes 106*a-c* from the buffers 104*a-d*. Each buffer has a limited capacity and can operate as a first-in-first out (FIFO) queue, such that when the application module 120*a-d* processes a status entry stored in the buffer 104*a-d*, the buffer 104*a-d* deletes the processed status update from the FIFO in its memory to free memory for additional status update(s). However, when the application module 120 sends a large number of status updates to the control unit 102 in a short period of time, the buffer 104*a-d* may not have enough memory to store all of the status updates. If the application modules 120*a-d* do not or cannot process the status messages, their respective buffers 104*a-d* may overflow. If this is the case, status updates can be lost and not processed by the application module because of the lack of free memory in the buffer to store the status updates. This is undesirable because it can cause errors.

The mainframes 106*a-c* are coupled to the control unit 102 over a link, such as a fiber-optic link 110. Each mainframe 106*a-c* can generate a respective status packet 108*a-c* to the application module 120*a*. The control unit 102 can receive a plurality of status packets 108*a-f*, which are then relayed to the buffers 104*a-c*. The status packets 108*a-f* can indicate, for example, whether the mainframe is online or off-line. The status packets 108*a-f* can be reduced to values in table(s) when the status of the mainframe 106*a-c* changes to reduce the amount of status packets sent over the link 110.

Figure 2:
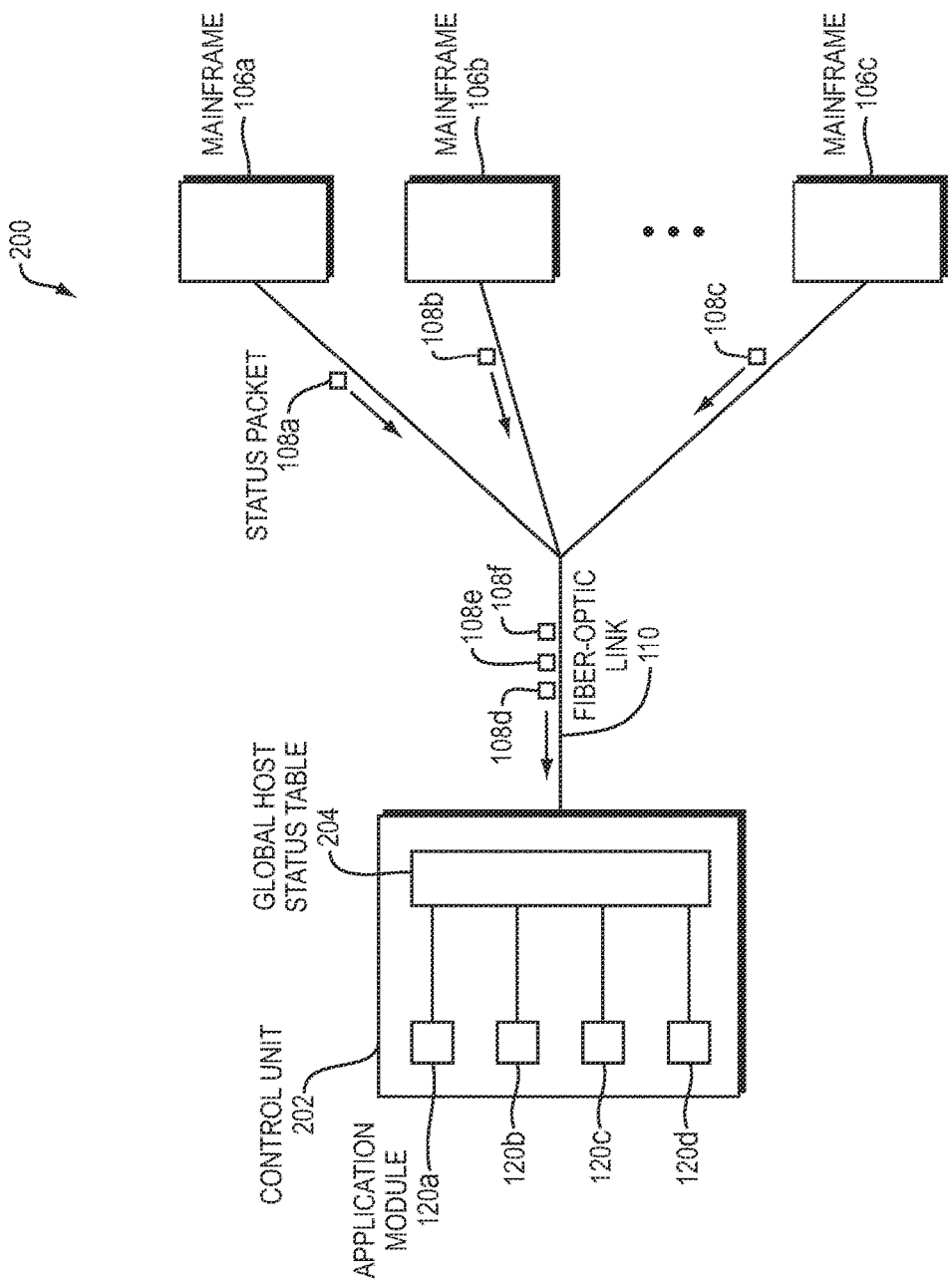
FIG. 2 is a block diagram illustrating an example embodiment of the control unit employing a global host status table.

FIG. 2 is a block diagram 200 illustrating an example embodiment of a control unit 202 employing a global host status table 204. In this embodiment, the mainframes 106*a-c* operate as described in FIG. 1, generating status packets 108*a-f* which are sent over the fiber-optic link 110 to the control unit 202. In this embodiment relating to FIG. 2, the control unit 202 receives the status packets 108a-f at the global host status table 204. The global host status table 204 is accessible by all of the application modules 120a-d. The global host status table 204 includes a status entry corresponding to each mainframe 106a-c (e.g., devices or hosts). Upon receiving a status packet 108a-f, the global host status table 204 updates the status of the mainframe 106a-c that originated the status packet 108a-f. For example, the global host status table 204 has an entry for each mainframe 106a-c that indicates the status of that particular mainframe. Upon a request, generated from the application modules 120a-d, the global host status table 204 can return the status of the particular mainframe 106a-c to the application module 120a-d. In this manner, application modules 120a-d pull the status of the mainframe 106a-c on-demand, instead of pushing the status packets 108a-f to a memory-limited buffer (e.g., buffers 104a-c, FIG. 1) whether or not the application module 120a-d needs the status update of the mainframe 106a-c.

FIG. 3 is a table 300 illustrating an example embodiment of the global status table 204. The global status table 204 includes a host ID column 302, a status column 304, and a timestamp column 306. The host ID 302 indicates for which mainframe the row stores the status. The status 304 indicates the status of the particular mainframe. The timestamp 306 indicates the time the particular host/mainframe updated the control unit with a status packet. The global status table 204 also includes a plurality of rows 308, 310, 312 and 314 indicating statuses and timestamps of various hosts.

Figure 4:
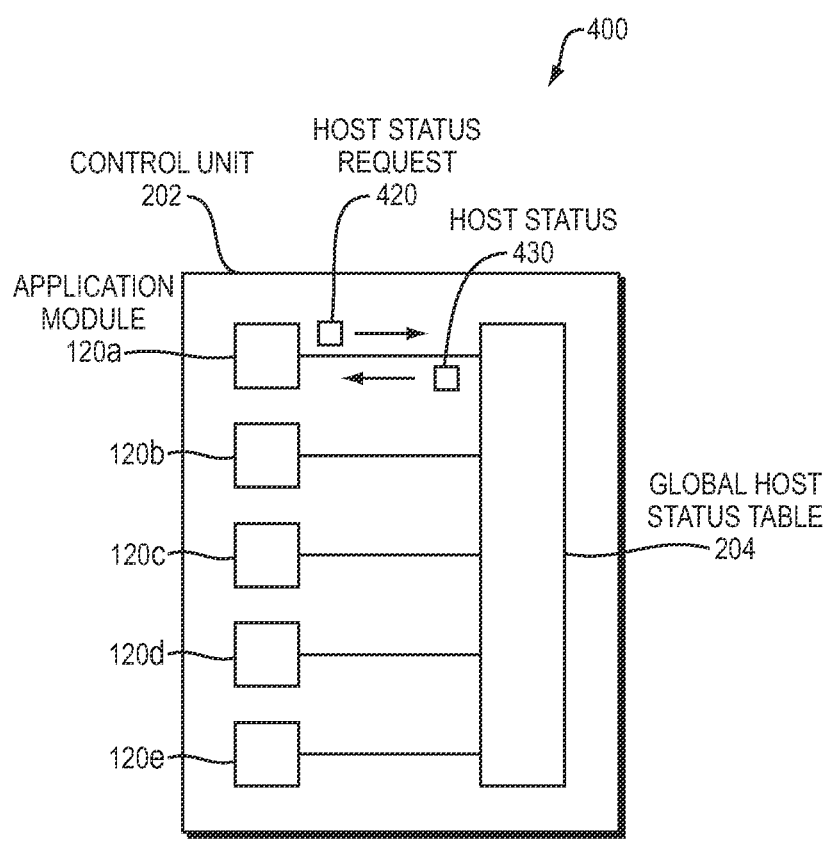
FIG. 4 is a block diagram illustrating an example embodiment of a control unit.

FIG. 4 is a block diagram 400 illustrating an example embodiment of a control unit 202. The control unit 202 includes a plurality of application modules 120a-e coupled with the global host status table 204. An application module 120a-e can issue a host status request 420 to a process run by the control unit 202 controlling the global host status table 204. Upon receiving the host status request 420, the process run by the control unit 202 responds with a host status 430 loaded from the global host status table 204. Further, the process run by the control unit 202 can check the timestamp of when the particular host updated the global host status table 204 against a timestamp in the host status request 420 that indicates the last time the application module 120a-e requested the status of the host. If the timestamp in the request 420 is later than the timestamp in the table 204, then the status does not need to be updated and optionally the host status 430 does not need to be sent to the application module 120a-e.

Figure 5A:
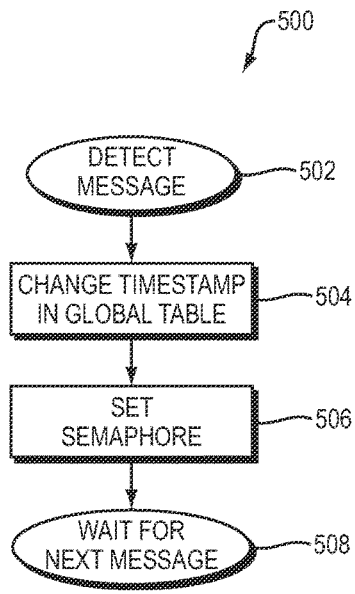
FIG. 5A is a flow diagram illustrating an example embodiment of a process employed by a kernel configured to process messages and/or events using state-based message generation.

FIG. 5A is a flow diagram 500 illustrating an example embodiment of a process employed by a kernel configured to process messages and/or events using state-based message generation. The kernel first detects a received message (502). Upon detecting the received message (502), the kernel changes the timestamp in the global host status table and updates the host status (504). Then, the kernel sets a semaphore indicating receipt of a message for a particular machine (506). Then, the kernel waits for a next message/event (508).

Figure 5B:
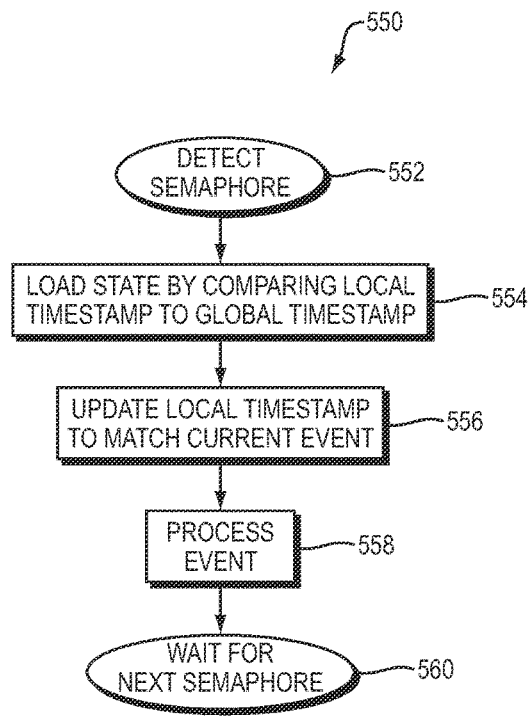
FIG. 5B is a flow diagram illustrating an example embodiment of a process employed by an application configured to utilize the global host status table.

FIG. 5B is a flow diagram 550 illustrating an example embodiment of a process employed by an application configured to utilize the global host status table in parallel with the process described in relation to FIG. 5A. In relation to FIG. 5B, the application first detects a semaphore set by the kernel (552). The application then loads the state of the link or machine from the global host status table by comparing the local timestamp of the application to the timestamp in the global host status table (554). If the local timestamp is earlier than the global timestamp, then the application has to load the new status of the link or machine. Then, the application updates its local timestamp to match the time of the current event (556). Then, the application processes the event (558). The application then waits to detect another semaphore (560).

Figure 6:
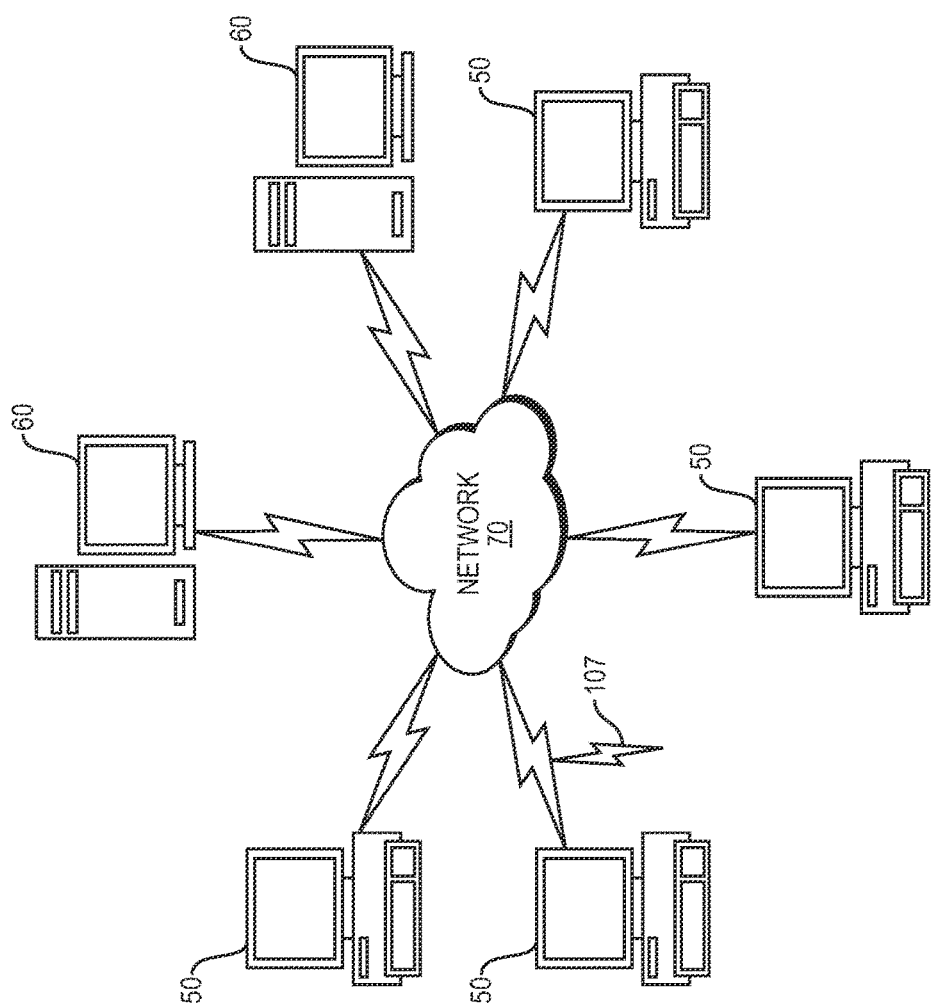
FIG. 6 illustrates a computer network or similar digital processing environment in which the present invention may be implemented.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
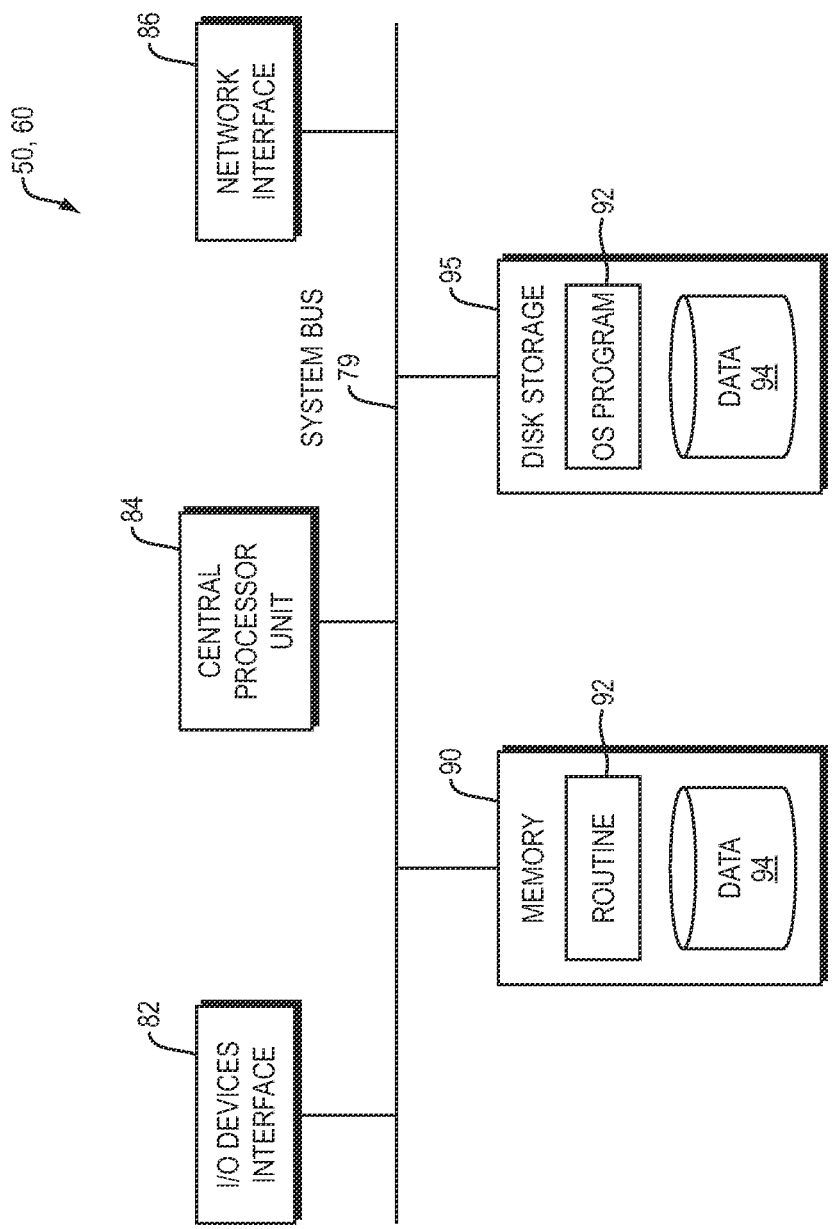
FIG. 7 is a diagram of the internal structure of a computer in the computer system of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., global host status table code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While embodiments have been particularly shown and described with references to example embodiments thereof, it will be understood by those skilled in the art that various changes in form and details may be made therein without departing from the scope of the embodiments encompassed by the appended claims.

What is claimed is:

1. A method comprising:
   upon receiving a status packet from a first device, updating a table stored in a memory with an operational state conveyed by the status packet, the operational state comprising one or both of (i) a state of the first device and (ii) a state of a communication link to the first device, the table being updatable by the first device and at least one other device, the memory residing in a control device configured to receive and process status packets, the control device being distinct from the first device and at least one other device;
   associating the operational state stored in the table with a timestamp;
   in response to a request for the operational state from a first application module, generating and sending to the first application a message different from the status packet and previously unseen by the first application module that includes, from the table, the operational state having an earliest associated timestamp;
   notifying the application module that the table stores an updated operational state;
   upon receiving the updated operational state, setting a semaphore; and
   requesting, from the application module and in response to the set semaphore, the updated operational state to the first device;
   the table being accessible by the first application module and at least one other application module, the first application module and at least one other application module also residing in the status packet control device, the application modules being processing application modules.

2. The method of claim 1, further comprising:
   classifying the operational state into a category;
   locating, in the table, a second operational state associated with the category;
   overwriting, in the table, the located operational state with the operational state contained in the status packet.

3. The method of claim 1, wherein the operational state represents the availability of a host over a network.

4. The method of claim 1, further comprising waiting to receive the notification before requesting the operational state.

5. The method of claim 1, wherein the table stores a plurality of operational states for the first device.

6. The method of claim 1, wherein the table stores operational states for a plurality of devices.

7. The method of claim 1, further comprising:
   receiving, from the application module, a timestamp of a last seen message by the application module;
   wherein generating the second message further includes determining updates to the operational since the timestamp of the last seen message.

8. A system comprising:
   an update module configured to, upon receiving a status packet from a first device, update a table stored in a memory with an operational state conveyed by the status packet, the operational state comprising one or both of (i) a state of the first device and (ii) a state of a communication link to the first device, the table being updatable by the first device and at least one other device, the memory residing in a control device configured to receive and process status packets, the control device being distinct from the first device and at least one other device;
   an association module configured to associate the operational stored in the table with a timestamp;
   a table update module configured to, in response to a request for the operational state from a first application module, generate and send to the first application a message different from the status packet and previously unseen by the first application module that includes, from the table, the operational state having an earliest associated timestamp; and
   a notification module configured to:
      (i) notify the application module that the table stores an updated operational state;
      (ii) upon receipt of the updated operational state, set a semaphore; and
      (iii) request, from the application module and in response to the set semaphore, the updated operational state to the first device;
   the table being accessible by the first application module and at least one other application module, the first application module and at least one other application module also residing in the control device, the application modules being processing application modules.

9. The system of claim 8, further comprising:
   a classification module configured to classify the operational state into a category; and
   a search module configured to locate, in the table, a second operational state associated with the category, wherein the table update module is configured to overwrite, in the table, the located state with the operational state contained in the status packet.

10. The system of claim 8, wherein the operational state represents the availability of a host over a network.

11. The system of claim 8, wherein the application module is further configured to wait to receive the notification before requesting the state of the communication link to the first device.

12. The system of claim 8, wherein the table stores a plurality of operational states for the first device.

13. The system of claim 8, wherein the table stores operational states for a plurality of devices.

14. The system of claim 8, wherein the update module is further configured to receive, from the application module, a timestamp of a last seen message by the application module and wherein the table update module is further configured to determine updates to the operational state since the timestamp of the last seen message.

15. A non-transitory computer readable medium configured to store instructions, which, when executed by a processor, performs instructions comprising:

upon receiving a status packet from a first device, updating a table stored in a memory with an operational state conveyed by the status packet, the operational state comprising one or both of (i) a state of the first device and (ii) a state of a communication link to the first device, the table being updatable by the first device and at least one other device, the memory residing in a control device configured to receive and process status packets, the control device being distinct from the first device and at least one other device;

associating the operational state stored in the table with a timestamp;

in response to a request for the operational state from a first application module, generating and sending to the first application a message different from the status packet and previously unseen by the first application module including the operational state, from the table, having an earliest associated timestamp;

notifying the application module that the table stores an updated operational state;

upon receiving the updated operational state, setting a semaphore; and requesting, from the application module and in response to the set semaphore, the updated operational state to the first device;

the table being accessible by the first application module and at least one other application module, the first application module and at least one other application module also residing in the control device, the application modules being processing application modules.

16. The non-transitory computer readable medium of claim 15, further comprising:

classifying the operational state into a category;

locating, in the table, a second state associated with the category;

overwriting, in the table, the located state with the operational state contained in the status packet.

* * * * *